United States Patent [19]

Strader et al.

[11] 3,960,388
[45] June 1, 1976

[54] VEHICLE SUSPENSION SYSTEM AND ALIGNMENT MECHANISM THEREFOR

[75] Inventors: Don S. Strader; Lloyd G. Masser, both of Muskegon; Robert J. Lundwall, Roosevelt Park, all of Mich.

[73] Assignee: Lear Siegler, Inc., Santa Monica, Calif.

[22] Filed: Mar. 27, 1975

[21] Appl. No.: 562,444

[52] U.S. Cl. ............................ 280/693; 280/672; 267/47
[51] Int. Cl.² .................................... B60G 3/26
[58] Field of Search ...... 280/124 R, 96.2 R, 96.2 B; 267/47, 54 R

[56] References Cited
UNITED STATES PATENTS

| | | | |
|---|---|---|---|
| 2,065,071 | 12/1936 | Harris | 280/96.2 R |
| 3,482,854 | 12/1969 | Masser | 280/124 R |

FOREIGN PATENTS OR APPLICATIONS

| | | | |
|---|---|---|---|
| 28,438 | 5/1964 | Germany | 280/96.2 R |

Primary Examiner—Philip Goodman
Assistant Examiner—John A. Carroll
Attorney, Agent, or Firm—McGarry & Waters

[57] ABSTRACT

A suspension system for a vehicle such as a trailer or tractor wherein ground-engaging wheels on an axle are mounted on a pair of control arms, which in turn are pivotably mounted for vertical swinging motion at one end to frame brackets laterally disposed at opposite sides of the vehicle frame. Spring means are disposed in a load-transmitting relation between another end of the control arm and the vehicle frame. The pivotal connection between the frame bracket and the control arm includes a bolt which passes through an aperture in the control arm and slotted apertures in the frame bracket to provide fore and aft adjustment of the control arm at the pivotal connection. This slotted connection facilitates alignment of the axle relative to the vehicle frame. The bolt is carried in the slotted adjustment apertures by special mounting plates which have means for pivotably supporting the plate on the frame bracket and means for gripping the mounting plates for movement with respect to the frame brackets. Once aligned, the suspension assembly is initially secured by tightening a nut on the bolt. The mounting plates are then welded to the frame bracket to fix the alignment of the suspension assembly relative to the vehicle frame. The adjustable connection provided by the special mounting plates can be functionally adapted to a variety of control arm applications, such as, trailing arm suspension systems or radius rods used in conventional leaf spring suspension systems.

19 Claims, 7 Drawing Figures

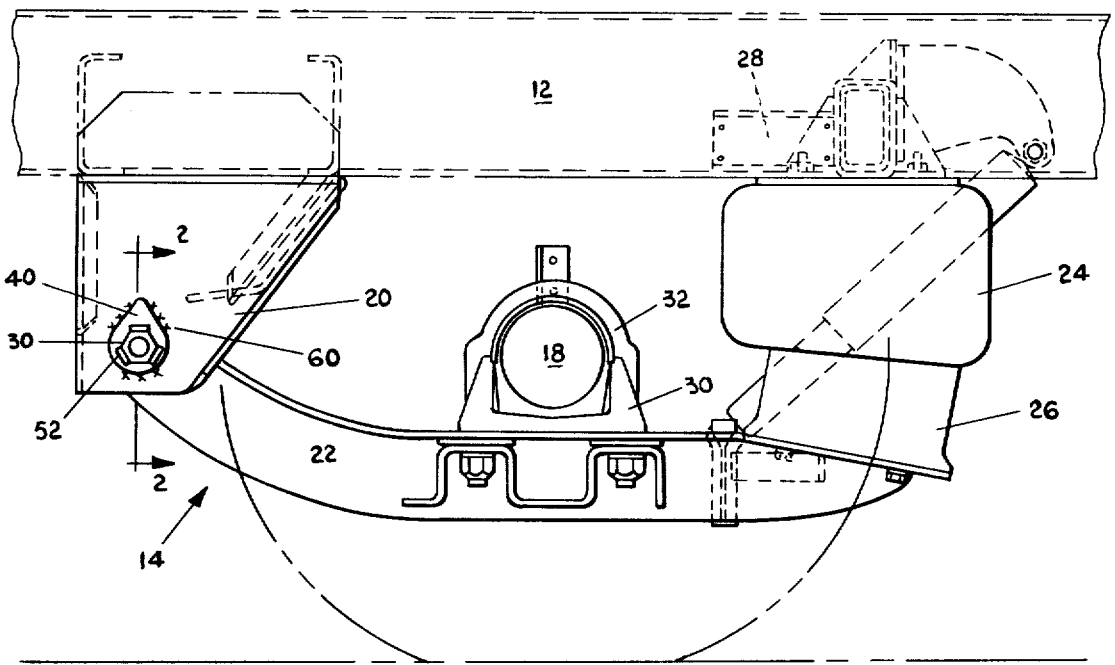
FIG. 1
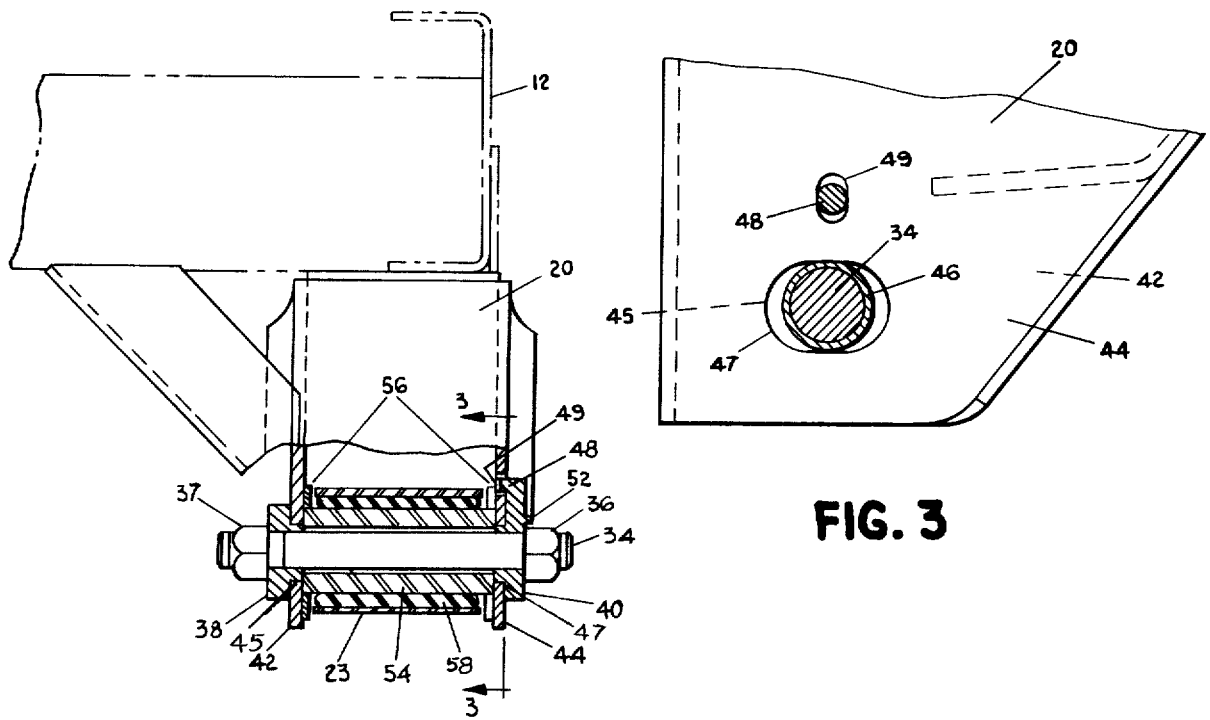
FIG. 2
FIG. 3

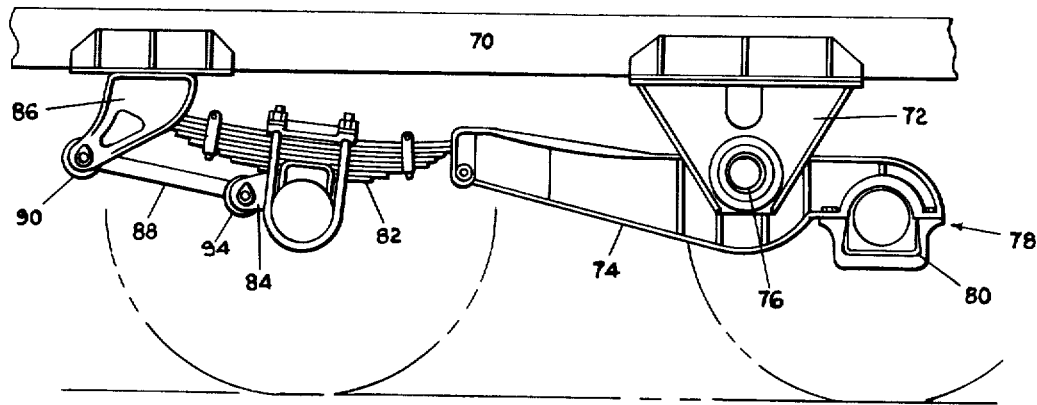
FIG. 5
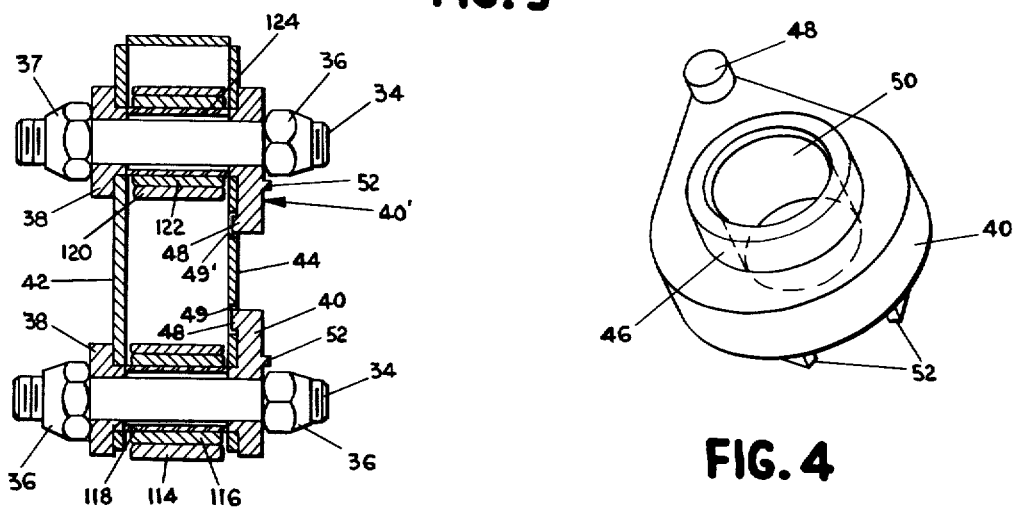
FIG. 7
FIG. 4
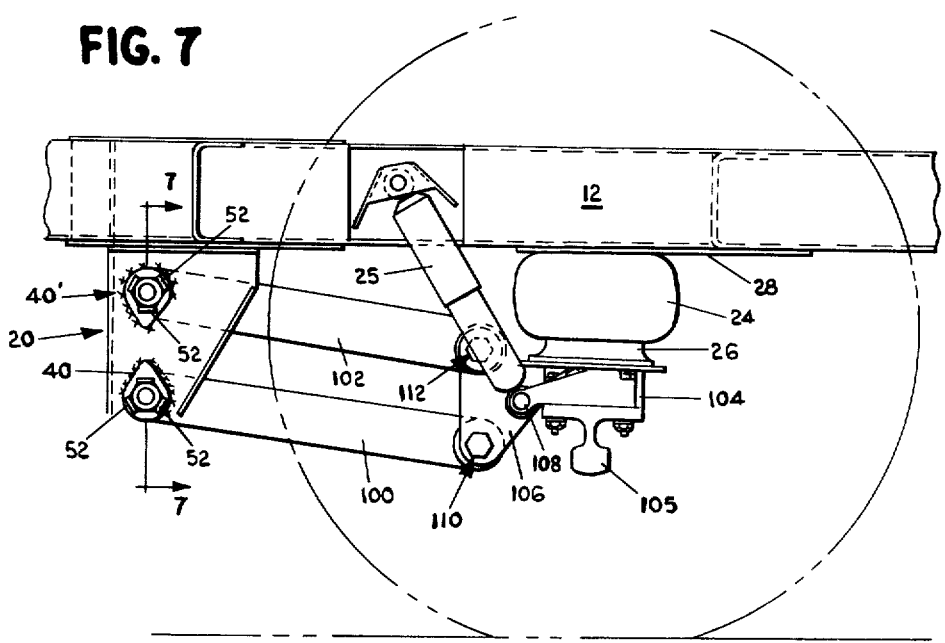
FIG. 6

VEHICLE SUSPENSION SYSTEM AND ALIGNMENT MECHANISM THEREFOR

BACKGROUND OF THE INVENTION

1. Field of the Invention

This invention relates to suspension systems for trailers, tractors, and other vehicles wherein the suspension system has means for fore or aft adjustment of the axle with respect to the vehicle frame for wheel alignment.

2. State of the Prior Art

In vehicle suspensions employing vertically swingable trailing arms or conventional leaf springs with radius rods to support the axle, it is known to provide adjustment means to allow fore or aft adjustment of the axle relative to the vehicle frame. Such an adjustment is necessary during the mounting of the suspension to the vehicle and subsequently during repair or routine maintenance to assure that the axles are properly aligned with respect to the longitudinal axis of the vehicle.

Conventionally, the adjustment provision in suspension systems of this type took the form of adjusting screws, cams, turnbuckles and other like devices. Once aligned, the adjustment was locked by tightening a mechanical device to secure the assembly in its relatively aligned state. This conventional adjustment system had some undesirable characteristics: The mechanical locking devices were susceptible to loosening due to wear and usage with consequent deterioration of alignment; the mechanical locking devices were susceptible to the well-meaning tinkering of truck drivers or unqualified mechanics attempting alignment corrections by hit or miss methods; and, such mechanical locking devices generally require a plurality of parts thereby increasing the complexity, weight and cost of the suspension.

A simplified and more durable adjustment system is disclosed and claimed by Masser in U.S. Pat. No. 2,481,891. In the Masser adjustment system, elongated apertures in the form of slots are provided in the frame mounting brackets. A bolt is passed through the elongated apertures and through an aperture in the end of the trailing arm. The slots enable the trailing arm to be adjusted fore or aft relative to the vehicle frame. Plates are carried by the bolt and abut a raised lug on each side of the frame bracket. These plates are welded to the sides of the frame bracket after alignment, thereby fixing the adjustment mechanism in its aligned position. Once welded, the connection is no longer susceptible to tinkering or gradual loosening and, further, the trailing arms can be disassembled and reassembled without affecting the alignment. The Masser alignment system is a substantial improvement over the conventional mechanical adjustment locking devices. However, it requires the use of several special parts or special fittings added to conventional parts. Further, the fore or aft adjustment prior to welding, or in subsequent adjustments where the weld has been burned away, are accomplished through the rather crude and imprecise method of striking the trailing arm assembly while in a loosened condition to move the assembly in the desired direction.

SUMMARY OF THE INVENTION

The invention provides a suspension system with provision for adjustment at the pivotal connection between a rigid axle control arm and a vehicle frame bracket. The laterally disposed sides of the frame bracket are provided with elongated apertures, and an aperture is provided at an end of the rigid axle control arm. The apertures of the control arm and the frame bracket sides are aligned with the control arm disposed between the frame bracket sides. A bolt is passed through the apertures thus providing a pivotal connection between the control arm and frame bracket which may be shifted in the elongated apertures to achieve alignment of the axle relative to the longitudinal axis of the vehicle frame.

According to the invention, the adjustment procedure is facilitated by means of a novel mounting plate having a raised axial boss on the inner face thereof slidably positioned within the elongated aperture of the frame bracket side. A smaller circular boss is provided at an upper portion of the inner face of the mounting plate and operably positioned within a circular aperture vertically above the elongated aperture in the frame bracket side. Rotation means are provided on the mounting plate comprising raised lugs on the opposite face from the raised axial boss and disposed so that they engage the sides of a nut or bolt-head, which when rotated with a wrench, will in turn rotate the mounting plate. A bolt hole is provided through the raised axial boss of the mounting plate and the bolt passing through the apertures of the control arm and frame bracket sides passes therethrough. Tightening means are provided on the bolt to secure the assembly after rotating the mounting plate to move the pivotal connecting assembly fore or aft into a position of relative axle alignment.

Once alignment is achieved and the tightening means secured the mounting plate is welded to the frame bracket side. Thereafter, the tightening means may be loosened and the bolt withdrawn to disassemble the control arm and subsequently reassemble same without altering the alignment. Alignment changes can be accomplished only by burning off the weld, rotating the mounting plate to achieve realignment, and again welding the mounting plate to the frame bracket.

Desirably, a second mounting plate having only a single raised boss is slidably positioned in the elongated aperture of frame bracket opposite the side in which the pivotable mounting plate is mounted. A bolt hole is provided through the raised boss to accommodate the connecting bolt with tightening means. The second mounting plate is likewise welded to the frame bracket side once alignment is achieved.

In one embodiment, the axle control arm has sleeved apertures at both ends. At one end there is provided a pivotable connecting assembly to a frame bracket with adjustment means as described in the foregoing summary. The other end is pivotably connected to an axle mount bracket with identical adjustment means as are described above for use with the frame bracket.

BRIEF DESCRIPTION OF THE DRAWINGS

The invention will now be described with reference to the accompanying drawings in which:

FIG. 1 is a side elevational view of a suspension system according to the invention, the suspension system being secured to the frame of the vehicle, and illustrating a first embodiment of the invention;

FIG. 2 is a sectional view taken along line 2—2 of FIG. 1;

FIG. 3 is a partial sectional view taken along line 3—3 of FIG. 2;

FIG. 4 is a perspective view of the pivotable mounting plate utilized in the suspension system of FIGS. 1–3;

FIG. 5 is a side elevational view of a second suspension system employing adjustable connections according to the invention and illustrating a second embodiment of the invention;

FIG. 6 is a side elevational view of a third suspension system and illustrating a third embodiment of the invention; and FIG. 7 is a partial sectional view taken along lines 7—7 of FIG. 6.

DETAILED DESCRIPTION OF THE PREFERRED EMBODIMENTS

Referring to the drawings, there is illustrated in FIG. 1, a suspension system 14 for trailers. Generally, such a suspension system is used on each side of the vehicle. For purposes of simplicity, only one side of the suspension system is shown.

The suspension system 14 embodying the present invention connects an axle 18 to a frame member 12 through a load-bearing pivotally connected, longitudinally extending trailing arm 22 which controls the movement of the axle in a well known manner. The axle 18 is adapted to have mounted thereon in conventional fashion ground-engaging wheels one of which is shown in phantom lines in FIG. 1. Each trailing arm 22 is pivotally connected to a frame bracket 20 which in turn is welded and braced to a frame member 12. The trailing arms swing vertically about their pivotal connections which are substantially coaxial. The vertical-swinging end portion of the trailing arm 22 has mounted thereon an air spring pedestal 26. Vertically above this pedestal and mounted on the frame member 12 is an air spring frame mount bracket 28. An air spring 24 is disposed in load-transmitting relation between the frame mount bracket 28 and the pedestal mount 26. The axle 18 is connected to each of the trailing arms 22 by an axle mounting bracket 30 with U-bolts 32 passing around the axle and through holes in the trailing arms. A shock absorber 25 is secured to a rear portion of the trailing arm 22 at one end and to the frame 12 at the other end thereof. The structure generally described above is well known in the art of suspension systems and further discussion thereof is believed unnecessary.

Referring to FIG. 3, frame bracket 20 has two laterally disposed sides 42 and 44, which are provided with aligned openings 45 and 47, the openings being elongated in a direction longitudinal of the trailing arms 22. Additionally, one side 44 of each frame bracket has a smaller slotted opening 49 vertically above the elongated opening 47.

The pivoting end of the trailing arm 22 has a sleeved portion 23 welded thereto as illustrated in FIG. 2, and of a length somewhat less than the space between the sides 42 and 44 of the frame bracket 20. Within the sleeve opening is press fitted a cylindrical torsion bushing 58 of elastomeric material. The inner surface of torsion bushing 58 is bonded to a metal spacer sleeve 54, the ends of which are disposed in a metal-to-metal contact with frame bracket sides 42 and 44, and aligned with slots 45 and 47. Washers 56 are spaced between the inner faces of frame bracket sides 42 and 44, and the sleeved end portion 23 of the trailing arms. As shown in FIG. 2, mounting plates 38 and 40 are engaged against the outer faces of the frame bracket sides 42 and 44.

Each of the mounting plates 38 and 40 are provided with an axial boss 46 centered on the inner faces of the plates and having a diameter slightly smaller than the minor cross-dimension of the elongated openings 45 and 47, in the frame bracket sides 42 and 44, respectively. The mounting plate 40 is tear-drop shaped and has at an upper portion a small circular boss 48 disposed on the inner face thereof. A circular opening 50 is provided at the center of the axial boss 46 through which passes the headless bolt 34. Nuts 36 and 37 are positioned on the ends of bolt 34. On the outer face of the tear-drop shaped mounting plate 40 are three raised lugs 52, angularly positioned about the circular opening 50 so as to engage the sides of the hexagon outer nut 36. When in position against the outer face of the frame bracket 44 the small circular boss 48 on the tear-drop shaped mounting plate 40 fits within the slotted opening 49 and pivotally supports the mounting plate on the frame bracket side 44 with the larger raised axial boss 46 positioned within the elongated aperture 47. Thus, the boss 48 moves vertically within the slotted opening 49 as the boss 46 moves within the aperture 47.

The inner mounting plate 38 is circular, rather than tear-drop shaped, and has neither the small circular boss nor the raised lugs. In all other respects mounting plate 38 is the same as the outer mounting plate 40.

A headless bolt 34, threaded at both ends, is passed through the mounting plate 38 and 40, through the elongated opening 45 and 47, through the washers 56 and through the spacer sleeve 54, thereby pivotally connecting the sleeved end portion 23 of the trailing arm to the frame bracket 20. Nuts 36 and 37 are threaded onto the opposite ends of the headless bolt. Alternatively, a bolt with a head can be used in place of the headless bolt.

When in assembled relation the inner nut 37 is loosely threaded onto bolt 34 so that the mounting plates 38 and 40 are free to move horizontally in the elongated opening 45 and 47 in the frame bracket sides 42 and 44. Thus, when the parts are loosely assembled, the trailing arm 22 can be moved fore or aft relative to the vehicle frame 12. This adjustment is easily and precisely accomplished by taking advantage of the novel eccentric mounting of the outer mounting plate. The outer nut 36 is grasped with a wrench and rotated either clockwise or counterclockwise. This rotation is also imparted to the outer mounting plate 40 through the raised nut-engaging lugs 52 on the face thereof. Mounting plate 40 pivots on the axis of the small circular boss 48 about slot 49 in the side of the frame bracket 20, and depending upon the direction in which the nut 36 is rotated, causes the trailing arm 22 to move either fore or aft in the elongated openings 45 and 47. Since the axle 18 and the trailing arm 22 are rigidly connected, the same fore or aft movement is imparted to the axle. By use of commercially available alignment apparatus, the axle 18 in this free moving state may be properly positioned perpendicular to the longitudinal axis of the vehicle. Once aligned, the inner nut 37 is tightened to initially secure the trailing arm 22 and axle 18 in their proper position. Once secure, the mounting plates 38 and 40 are welded along their sides at 60 (FIG. 1) to the outer faces of the frame bracket sides 42 and 44. The welding secures the trailing arm-axle assembly in proper alignment relative to the vehicle frame 12. Once welded, the trailing arm 22 may be disassembled from the frame mounting bracket 20 simply by removing inner nut 37 and withdrawing bolt 34. The mounting plates 38 and 40 having been welded in place remain fixed in their proper position in the frame bracket sides 42 and 44. At this point, routine maintenance, such as torsion bushing replacement, or other repair functions may be performed on the suspension parts. When reassembled, the axle 18 will reassume its properly aligned position without the time consuming necessity of realigning the axles. An additional advantage is that the alignment cannot be tampered with by well-meaning drivers or garage mechanics during normal usage. Further, there is less susceptibility to misalignment caused by distorting forces which may be encountered in normal or even abusive usage. Should it happen that the axle does become misaligned during the life of the vehicle, realignment is a relatively simple procedure in a suitably equipped maintenance facility. The welds 60 at the edges of the mounting plates 38 and 40, are burned off and then the inner nut 37 is sufficiently loosened to again allow fore and aft movement of the mounting plates 38 and 40, in the elongated openings 45 and 47, in the frame bracket sides 42 and 44. Alignment apparatus is then used to realign the trailing arm-axle assembly 21 and 18, relative to the vehicle frame 12. The inner nut 37 is then retightened and the mounting plates 38 and 40 are welded again in position. If, during this procedure it is found necessary to replace the mounting plates 39 and 40, one need only remove the bolt 34, discard the mounting plates 42 and 44, and replace them with new plates to be welded in place.

In FIG. 5, there is illustrated a second embodiment of the invention wherein the axle control arm comprises a radius rod 88 and conventional leaf spring 82, in a different type of suspension system.

The second embodiment of the present invention illustrates a suspension system for a vehicle having a frame 70. A trunion frame bracket 72 is secured to the underside of the frame 70 and a beam assembly 74 is pivotally mounted to the frame bracket 72 through a trunion assembly 76. An axle assembly 78 includes an axle casting 80 which is welded to the axle. A leaf spring assembly 82 is pivotably mounted to one end of the beam assembly 74 in a conventional manner and the other end is mounted in a conventional manner to a spring hanger bracket 86 which is secured to the frame member 70. An axle mounting 84 is secured to a central portion of the leaf spring assembly 82 for supporting a second axle in a well-known manner. Wheels illustrated in phantom lines in FIG. 5 show the relationship between the wheels and the suspension system. A radius rod 88 is pivotably mounted to the axle mounting 84 through connection 94 at one end and to the hanger bracket 86 at the other end through pivotable connection 90.

One or both of the pivotable connections, 90 and 94, at the ends of the radius rod 88 are provided with an alignment assembly identical with that described above with reference to FIGS. 1-4 for fore or aft adjustment of the axles. FIG. 2 illustrates the manner in which radius rod connections 90 and 94 are adjustably mounted between the laterally disposed sides of the spring hanger bracket 86 at the one end and the axle mounting bracket 84 at the other end. Axle alignment is effected in the identical manner as the first embodiment by fore or aft adjustment of the mounting plates in the elongated apertures, secured and welded to permanently fix the axle in relative alignment with the longitudinal axis of the vehicle.

Referring now to FIGS. 6 and 7, there is shown a suspension system similar to FIG. 1 except that the trailing arm 22 has been replaced by a steering axle suspension system. In this embodiment, like numerals have been used to designate like parts.

The suspension system of FIGS. 6 and 7 comprises an air spring 24 secured to a frame 12 at one end through a mounting bracket 28 and to an axle bracket 104 at the other end through an air spring pedestal 26. A shock absorber 25 is mounted between the axle bracket 109 and the frame 12. Ground engaging wheels, shown in phantom lines in FIG. 6, are secured in conventional fashion to an axle (not shown) which is mounted to the frame bracket 104 through axle bracket 105.

A frame bracket 20 is secured to the frame 12 and pivotably mounts a pair of control arms 100 and 102. The opposite ends of the control arms 100 and 102 are pivotably mounted to triangular bracket 106 through mounting means 110 and 112, respectively.

The control arm 100 is mounted to the frame bracket 20 through mounting plates 40 and 38 which are identical in all respects to the mounting plates of like numerals illustrated in FIGS. 1-4. The mounting plate 40 has on one side a circular boss 48 which is pivotably mounted in a slotted opening 49 in the side 44 of frame bracket 20. Raised lugs 52 are formed on the face of the bracket 40.

The control arm 102 is mounted to the frame bracket 20 in a manner similar to arm 100. However, mounting bracket 40' is inverted with respect to bracket 40. The mounting bracket 40' has on one side thereof a circular boss 48 which is pivotably mounted in a slotted hole 49' of frame bracket side 44. The mounting bracket 49' is otherwise the same as bracket 49. Nuts 36 engage the lugs 52 to prevent rotation of the nuts 36 with respect to brackets 40 and 40'.

Like arm 100, arm 102 has a sleeve 114 in which is press fit in concentric relationship a compressible bushing 122 and a metal sleeve 124. The bolt 34 extends through the center of sleeve 24 so that the arm 102 pivots on bolt 34.

The arms 100 and 102 function in a manner similar to trailing arms 22 in the first embodiment. The arms 100 and 102 provide a rigid axle control to permit the axle to move vertically in a defined pattern. The brackets 40 and 40' provide a means to adjust the position of the axle with respect to the frame as well as a camber adjustment of the axle. To carry out this adjustment function, the nuts 36 are turned to rotate brackets 40 and/or 40'. Once the alignment is obtained, the brackets 40 and 40' are welded into place. Differential adjustment of the brackets 40 and 40' provides the camber adjustment.

Thus, in the embodiment of FIGS. 1 through 4, a bottom portion of the frame bracket 44 forms a connecting plate means on which the mounting plate 40 is mounted. The bolt 34 and nuts 36, 37 provide a means for releasably locking the mounting plate to the connecting plate to fix the position of the axles relative to the frame bracket subsequent to adjustment. The lugs 52 on the mounting plate 40 provide a retaining means on the mounting plate for gripping the nut 36 of the releasable locking means so that the nut 36 can be gripped and rotated to rotate the mounting plate when bolt 37 is loosened.

In the embodiment shown in FIG. 5, the axle mounting 84 and/or the hanger bracket 86 provide the connecting plate means for pivotably mounting the mounting bracket. In the embodiment of FIGS. 6 and 7, the bracket 44 provides the connecting plate means for pivotably mounting the two mounting plates.

Reasonable variation and modification are possible within the scope of the foregoing disclosure without departing from the spirit of the invention which is defined in the appended claims.

The embodiments of the invention in which an exclusive property or privilege is claimed are defined as follows:

1. A vehicle suspension system wherein the vehicle has a frame, an axle for mounting ground-engaging wheels, frame brackets laterally disposed at opposite sides of the frame, rigid axle control arm means with means at one end for pivotably connecting the control arm means to the frame brackets, means coupling said control arm means to said axle, at least one of said pivotable connecting means and said coupling means including a connecting plate means and adjusting means permitting fore or aft adjustment of the axle relative to the frame brackets, means for resiliently transmitting a load disposed between the vehicle frame and said axle, the improvement in said adjusting means comprising:
  a mounting plate;
  means for pivotably connecting the axle control arm means to the mounting plate;
  means pivotably supporting the mounting plate on the connecting plate means for rotation of the mounting plate to impart precise fore or aft movement of the axle relative to the frame bracket;
  means releasably locking the mounting plate to the connecting plate to fix the axle relative to the frame bracket subsequent to adjustment; and
  retaining means on the mounting plate for gripping a portion of the releasable locking means to prevent relative movement between the releasable locking means and the mounting plate regardless of whether the locking means is in a locked or released condition, whereby the mounting plate can be rotated by gripping and rotating the releasable locking means when the locking means is in released condition.

2. A vehicle suspension system according to claim 1 wherein said connector plate means is formed by one of said frame brackets and each frame bracket has laterally disposed sides having elongated apertures therein, said rigid axle control arm means has at least one end with an apertured portion, said apertured portion of the axle control arm means being disposed between the sides of the frame brackets and the apertures of the frame brackets and the control arm means being aligned.

3. A vehicle suspension system according to claim 2, wherein said mounting plate pivotable support means includes a vertically slotted aperture positioned vertically above the elongated aperture in the frame bracket forming the connecting plate means and a raised boss on said mounting plate operably positioned within said aperture.

4. A vehicle suspension system according to claim 3, wherein the pivotable mounting plate has provided on one side thereof a raised axial boss which is positioned within the elongated aperture, said elongated aperture having a horizontal cross-dimension substantially greater than the diameter of said axial boss, said horizontal cross-dimension being aligned in a generally longitudinal direction relative to the axis of the axle control arm means.

5. A vehicle suspension system according to claim 4, wherein said retaining means on the pivotable mounting plate comprises raised lugs on the opposite face from the raised axial boss and disposed so as to engage the sides of a nut or bolt-head which, when rotated with a wrench, will in turn impart a rotation to the mounting plate.

6. A vehicle suspension system according to claim 1, wherein said pivotable mounting plate has an aperture; said connector plate means are formed by one frame bracket and said frame brackets have apertured sides; said rigid axle control arm means have an apertured end and said releasable locking means extend through the apertures to pivotably connect said axle control arm means to said mounting plate.

7. A vehicle suspension system according to claim 6, wherein the pivotable mounting plate has a boss forming a bushing, an aperture extends through the boss, the releasable locking means passes through said boss, said releasable locking means comprising a headless bolt threaded at each end and nuts threaded onto each end of the headless bolt to tighten the mounting plate to the frame brackets.

8. A vehicle suspension system according to claim 6, wherein said releasable locking means comprise a bolt with a head and a nut threaded onto the end of the bolt to tighten the mounting plate to the frame brackets.

9. A vehicle suspension system according to claim 6, wherein the apertured end of the axle control arm means comprise a sleeved portion mounted transversely to the length of said arm, said sleeve having an inner diameter slightly greater than the diameter of the pin means and a length slightly less than the distance between the inner faces of the frame brackets.

10. A vehicle suspension system according to claim 1 wherein said pivotable connecting means comprise two mounting plates mounted in each frame bracket, the second mounting plate having a raised axial boss on one side thereof which is slidably positioned within an elongated aperture in a side of the frame bracket, said axial boss having an aperture extending therethrough, and pin means passing through said aperture.

11. A vehicle suspension system wherein the vehicle has a frame, an axle for mounting ground-engaging wheels, frame brackets laterally disposed at opposite sides of the frame, rigid axle control arm means with means at one end for pivotably connecting the control arm means to the frame brackets; means coupling said control arm means to said axle, at least one of said pivotable connecting means and said coupling means including a connecting plate and adjusting means for permitting fore or aft adjustment of the axle relative to the frame brackets, means for resiliently transmitting a load disposed between the vehicle frame and said axle, the improvement in said adjusting means comprising:
  a mounting plate;
  means for pivotably connecting the axle control arm means to the mounting plate;
  a weld connecting the mounting plate to the frame bracket in a position wherein said axle is properly aligned relative to the vehicle frame;
  means pivotably supporting the mounting plate on the connecting plate for rotation of the mounting plate prior to welding to impart precision fore or aft movement of the axle relative to the frame bracket;

means releasably locking the mounting plate to the connecting plate to fix the axle relative to the frame bracket subsequent to adjustment and prior to welding; and retaining means on the mounting plate for gripping a portion of the releasable locking means to prevent relative movement between the releasable locking means and the mounting plate regardless of whether the locking means is in a locked or released condition, whereby the mounting plate can be rotated prior to welding by gripping and rotating the releasable locking means when the locking means is in released condition.

12. A vehicle suspension system according to claim 11, wherein said connector plate is formed by one of said frame brackets and each frame bracket has laterally disposed sides having elongated apertures therein, said rigid axle control arm means have at least one end with an apertured portion, said apertured portion of the axle control arm means being disposed between the sides of the frame brackets and the apertures of the frame brackets and the control arm means being aligned.

13. A vehicle suspension system according to claim 12, wherein said mounting plate pivotable support means includes a vertically slotted aperture positioned vertically above the elongated aperture in the frame bracket forming the connecting plate means and a raised boss on said mounting plate operably positioned within said aperture.

14. A vehicle suspension system according to claim 13, wherein said retaining means on the pivotable mounting plate comprise raised lugs on the opposite face from the raised axial boss and disposed so as to engage the sides of a nut or bolt-head which, when rotated with a wrench, will in turn impart a rotation to the mounting plate.

15. A vehicle suspension system according to claim 14, wherein said pivotable mounting plate has an aperture; said connector plate means are formed by one frame bracket and said frame brackets have apertured sides; said rigid axle control arm means have an apertured end and said releasable locking means extend through the apertures to pivotably connect said axle control arm means to said mounting plate.

16. A vehicle suspension system according to claim 15, wherein the pivotable mounting plate is rotated to impart fore or aft movement of the pivotal connecting means into a predetermined aligned position and then welded to the face of the frame bracket side along the mating edges of the mounting plate, thereby fixing the pivotal connecting means in an aligned position.

17. A vehicle suspension system according to claim 16, wherein the releasable locking means is removable so that it can be withdrawn from the pivotal connecting assembly in its fixed position of relative alignment thereby permitting the axle control arm to be removed and subsequently reassembled without disturbing the relative alignment.

18. A vehicle suspension system according to claim 11, wherein said pivotable connecting means comprise two mounting plates in each frame bracket, the second mounting plate having a raised axial boss on one side thereof which is slidably positioned within an elongated aperture in a side of the frame bracket, said axial boss having an aperture extending therethrough, and said releasable locking means passing through said aperture.

19. A vehicle suspension according to claim 11 wherein said control arm means includes first and second arms extending between the frame brackets and said axle coupling means at each side of said vehicle, said first and second arms being vertically disposed with respect to each other and each having said adjusting means, whereby camber adjustments can be made to said axle.

* * * * *